(12) United States Patent
Bhalla et al.

(10) Patent No.: US 8,174,283 B2
(45) Date of Patent: *May 8, 2012

(54) CALIBRATION TECHNIQUE FOR MEASURING GATE RESISTANCE OF POWER MOS GATE DEVICE AT WAFER LEVEL

(75) Inventors: Anup Bhalla, Santa Clara, CA (US); Sik K. Lui, Sunnyvale, CA (US); Daniel Ng, Campbell, CA (US)

(73) Assignee: Alpha & Omega Semiconductor, Inc., Sunnyvale, CA (US)

( * ) Notice: Subject to any disclaimer, the term of this patent is extended or adjusted under 35 U.S.C. 154(b) by 291 days.

This patent is subject to a terminal disclaimer.

(21) Appl. No.: 12/454,004

(22) Filed: May 11, 2009

(65) Prior Publication Data

US 2009/0219044 A1    Sep. 3, 2009

Related U.S. Application Data

(62) Division of application No. 11/265,363, filed on Nov. 1, 2005, now Pat. No. 7,535,021.

(51) Int. Cl.
*G01R 31/02*    (2006.01)
*H01L 21/66*    (2006.01)

(52) U.S. Cl. .................................... 324/762.09; 438/14

(58) Field of Classification Search .............. 324/762.09, 324/757.03; 257/48
See application file for complete search history.

(56) References Cited

U.S. PATENT DOCUMENTS

| | | | | |
|---|---|---|---|---|
| 5,773,317 | A * | 6/1998 | Wu et al. ........................ | 438/17 |
| 6,146,908 | A * | 11/2000 | Falque et al. ................... | 438/11 |
| 6,472,233 | B1 * | 10/2002 | Ahmed et al. .................. | 438/14 |
| 6,873,173 | B2 * | 3/2005 | Kollmer et al. .......... | 324/750.16 |
| 7,045,384 | B1 * | 5/2006 | Pan et al. ..................... | 438/105 |
| 7,126,359 | B2 * | 10/2006 | Huang et al. ............. | 324/754.03 |
| 7,902,852 | B1 * | 3/2011 | Hess et al. ............... | 324/762.09 |

* cited by examiner

*Primary Examiner* — Huy Q Phan
*Assistant Examiner* — Joshua Benitez
(74) *Attorney, Agent, or Firm* — Bo-In Lin

(57) ABSTRACT

This invention discloses a method for calibrating a gate resistance measurement of a semiconductor power device that includes a step of forming a RC network on a test area on a semiconductor wafer adjacent to a plurality of semiconductor power chips and measuring a resistance and a capacitance of the RC network to prepare for carrying out a wafer-level measurement calibration of the semiconductor power device. The method further includes a step of connecting a probe card to a set of contact pads on the semiconductor wafer for carrying out the wafer-level measurement calibration followed by performing a gate resistance Rg measurement for the semiconductor power chips.

8 Claims, 6 Drawing Sheets

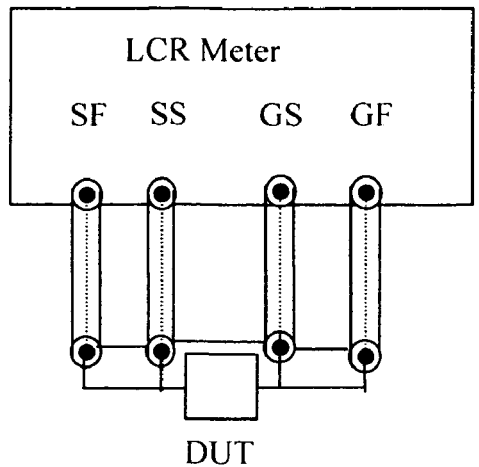
Fig. 3 (Prior Art)
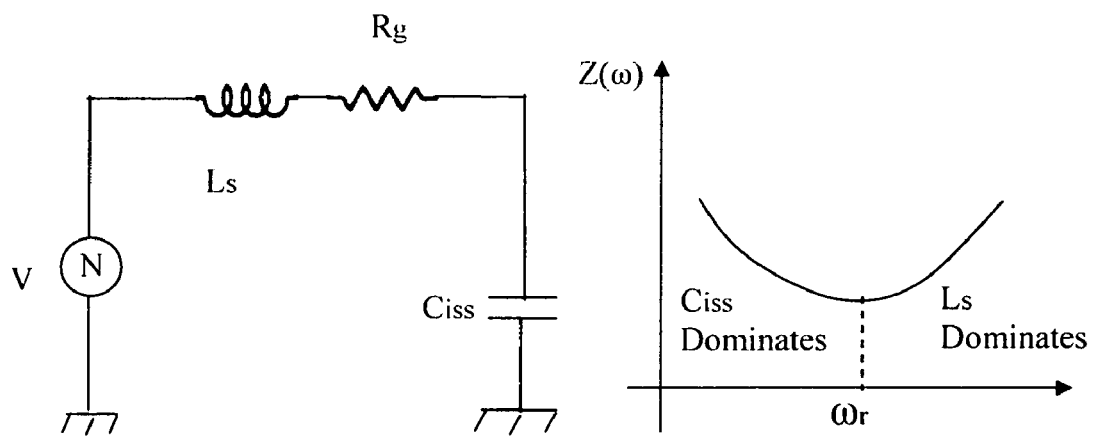
Fig. 4A (Prior Art)
Fig. 4B (Prior Art)

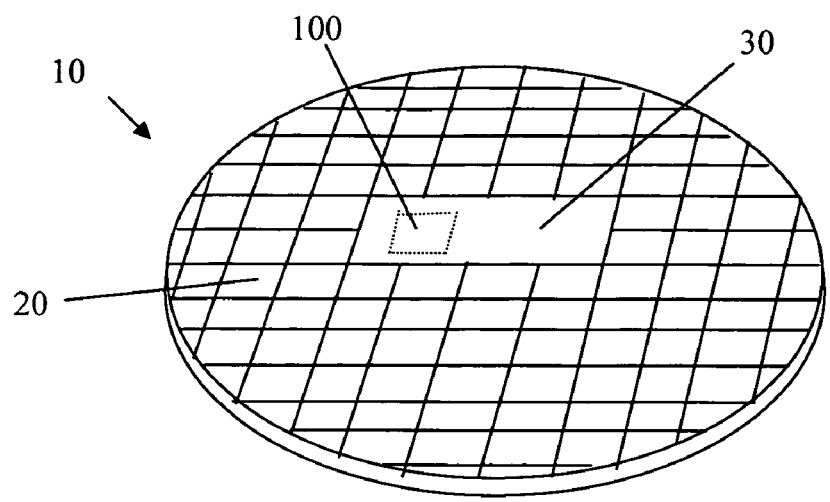
Fig. 5A
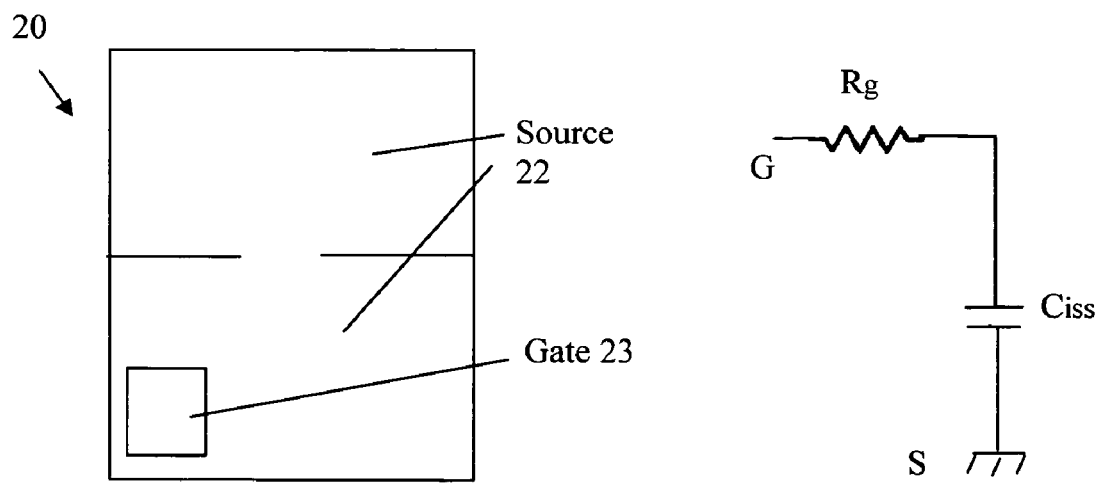
Fig. 5B
Fig. 5C

Wafer bottom

CALIBRATION TECHNIQUE FOR MEASURING GATE RESISTANCE OF POWER MOS GATE DEVICE AT WAFER LEVEL

This Patent Application is a Divisional Application and claims the Priority Date of an application Ser. No. 11/265,363 filed on Nov. 1, 2005 now U.S. Pat. No. 7,535,021 by common Inventors of this Application. The Disclosures made in the patent application Ser. No. 11/265,363 are hereby incorporated by reference.

BACKGROUND OF THE INVENTION

1. Field of the Invention

The invention disclosed herein relates generally to measurement of device parameter of an integrated circuit device in the device manufacturing process. More particularly, this invention relates to a new and more accurate measurement configuration and process to more conveniently obtain accurate device parameters on the wafer level of a semiconductor device.

2. Description of the Prior Art

With the advent of high-speed metal oxide semiconductor (MOS) gate devices for power-switching applications comes the need to accurately measure the equivalent series gate resistance (Rg). FIG. 1A shows the equivalent circuit of a metal oxide semiconductor field effect (MOSFET) based power device that comprises many MOSFET transistor cells. FIG. 1B shows this equivalent series gate resistance is in a series connection relationship with the input capacitance of the MOSFET to form an R-C network. Therefore, the series equivalent gate resistance cannot be measured by direct DC methods. Several AC methods are available to make this measurement. However, all of these methods require the calibration and cancellation of parasitic parameters inevitably arising from the testing circuits and cabling. Particularly, these cabling parasitic parameters are usually more difficult to deal with at the wafer level, since the die must be accessed through long cables connected between the testers and the probe card, and then via probes reaching to the die itself. Furthermore, as shown in FIG. 2, before a sawing operation is carried out on the wafer, the entire back plain of the wafer forms the second power electrode in a vertical device, and is accessed through similar long cables connected to the wafer chuck. Since the wafer chuck matches the wafer diameter, and may be four to twelve inches in diameter, this leads to considerable parasitic capacitance and inductance.

It is easier to measure the gate resistance at a final testing point after the MOS device is packaged. However, it is much more costly to reject a packaged device at the final test point. The loss caused by a rejected device at the final testing point includes the total cost of all the processes performed on the die and the package. For this reason, it is much more cost effective to screen out a potentially defective device at the wafer level. Cost savings are achieved by eliminating these unnecessary additional efforts and time spent on packaging these defective devices if the defective devices can be screened out at an earlier stage at the wafer level. Therefore, there exists a need to measure the device parameters as early as possible at the wafer level.

There are several alternate methods to calibrate and measure the equivalent gate resistance. FIG. 3 shows a configuration to carry out a direct AC testing method that uses an LCR meter for measuring the circuit impedance. The gate of a MOSFET device, i.e., the device under test (DUT), is treated as a simple R-C network. The gate resistance is measured using an LCR meter with a four-wire technique. An AC sinusoidal signal is applied to the device and the AC voltage, AC current and the phase difference is measured across the device. Then the impedance measurement is separated into a real part and an imaginary part with the real part representing the equivalent gate resistance Rg.

FIG. 4A shows another testing configuration to carry out a series resonance measurement. Since the device is a series RC network, a series inductance is introduced to create an RLC network as shown in FIG. 4A. By applying a frequency sweep across this network as that shown in FIG. 4B, a network impedance $Z(\omega)$ can be expressed as $Z(\omega)=Rg+j*[\omega Ls-(1/\omega Ciss)]$. The capacitive impedance $(1/\omega Ciss)$ and the inductive impedance $\omega Ls$ cancel each other at the resonant frequency $\omega r$ when $\omega r=1/(Ls*Ciss)^{1/2}$. A net-impedance is obtained and that is the equivalent gate resistance $Z(\omega r)=Rg$.

In reality, the implementation of both methods is complicated by the fact that the device behaves quite differently from a standard behavior of a simple RC network due to the existence of several parasitic parameters. When a direct AC method is applied, attention must be paid to the series inductance of the gate source network that arises from the die layout, the probe connections and the probe card and the cabling to the tester. Additionally, there are parasitic capacitances generated from connections of the cabling, the probe card, the probes, and the wafer chuck.

Normally, a simple open-short cancellation technique is available to deal with the parasitic effects. First, the probes are lifted up and the probes are disconnected from the Device Under Test (DUT). The impedance is measured and is used to determine the parasitic capacitance. Next, the probes are put down on a metal plane, with the probes shorted onto the wafer or the chuck, and the impedances are measured. The impedance measurement is used to determine the series parasitic resistance and inductance. However, in the first measuring step, it fails to correctly account for the chuck capacitance, while in the second measuring step, it fails to correctly account for the layout inductance. For these reasons, the cancellation techniques still do not provide an effective method to eliminate measurement errors caused by parasitic capacitances and inductances of wafer level measurements due to multiple cabling, probe card and probe connections and interfaces. In order to further improve the measurement accuracy, an additional correction known as load correction is applied by measuring a known R-C network. A printed circuit board (PCB) with predefined combination of resistance and capacitance is measured to carry out the additional process of load correction to enhance the measurement accuracy. However, this process can not eliminate probe card and die layout effects, because the PCB is not accessed through the same probe configuration.

Therefore, a need still exists in the art to provide an improved device design and test configurations and methods to overcome the above discussed limitations and difficulties.

SUMMARY OF THE PRESENT INVENTION

It is therefore an object of the present invention to provide an improved calibration device that includes a semiconductor wafer with a built-in resistor-capacitor (RC) network with accurately measurable resistance and capacitance. It is further an object of the invention to provide a probe card that is configured to carry out a measurement on the calibration device and the MOSFET transistors disposed on the same wafer as the RC network with the MOSFET transistors intended as the manufacturing product under calibration. It is further an object of the invention to provide a simplified method of gate resistance Rg measurement at wafer level by floating the drain during the Rg measurement. The technical difficulties of prior art to accurately calibrate the gate resistance Rg measurement at a wafer level are therefore resolved.

Specifically, it is an object of the present invention to provide an improved calibration device layout that includes a built in RC network where the resistance and capacitance can be accurately measured. The resistance and the capacitance of the built-in RC network are substantially at about the same range as the resistance and capacitance of the MOSFET transistors disposed on a same wafer as the RC-network. The drain electrode commonly implemented as a bottom of the wafer can be removed from the connections as part of the calibration operation. The calibration configuration significantly simplifies the measurement calibration processes because the parasitic capacitance and inductance from connections to the chuck substrate are eliminated.

Briefly in a preferred embodiment this invention discloses a MOSFET device that includes a plurality of MOSFET chips disposed on a semiconductor wafer wherein the semiconductor wafer further comprises a test area built with a resistor-capacitor (RC) network with a known resistance and capacitance and ready for carrying a wafer-level MOSFET measurement calibration. The wafer test area further includes a test structure with a set of contact pads in the same layout as the MOSFET device for connecting to a probe card for carrying out the wafer-level MOSFET measurement calibration followed by a gate resistance Rg measurement for the MOSFET chips. In a preferred embodiment, the resistance and capacitance of the RC network has a range approximately the same as the MOSFET gate resistance Rg and its input capacitance Ciss.

The present invention further discloses a method for calibrating a MOSFET gate resistance measurement that includes forming a RC network on a test area on a semiconductor wafer adjacent to a plurality of MOSFET chips and measuring a resistance and a capacitance of the RC network to prepare for carrying out a wafer-level MOSFET measurement calibration. The method further includes a step of connecting a probe card to a set of contact pads on the semiconductor wafer for carrying out the wafer-level MOSFET measurement calibration followed by performing a gate resistance Rg measurement for the MOSFET chips. In a preferred embodiment, the step of the forming the RC network further comprises forming a resistance and capacitance of the RC network having a range approximately the same as a range of a MOSFET gate resistance Rg and a capacitance of the MOSFET chips.

The present invention further discloses a probe card that can access both the calibration structure to measure the RC network for calibration and the MOSFET chips to measure the MOSFET Rg.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 3 shows connection diagram for showing a four wire LCR measurement setup for measuring the resistance of a device under test (DUT).

FIG. 4A shows another testing configuration to carry out a series resonance measurement and FIG. 4B shows the variation of cancellation of parasitic capacitance and inductance at a resonant frequency.

FIG. 5A shows a top view of a wafer layout and FIG. 5B and FIG. 5C show MOSFET layout and a corresponding RC network for measuring the device.

DETAILED DESCRIPTION OF THE METHOD

Figures 1A, 1B:
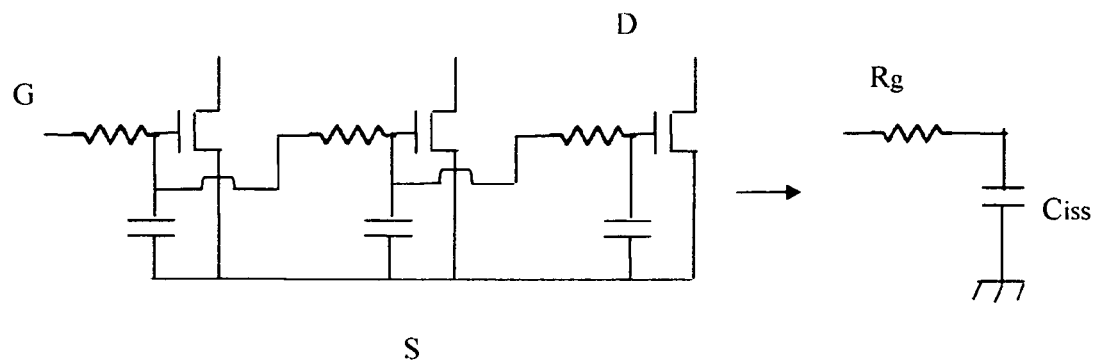
FIGS. 1A and 1B are circuit diagrams of a standard MOSFET device and the RC network involved in an operation for measuring an equivalent gate resistance of the MOSFET device of FIG. 1A.
Figure 2:
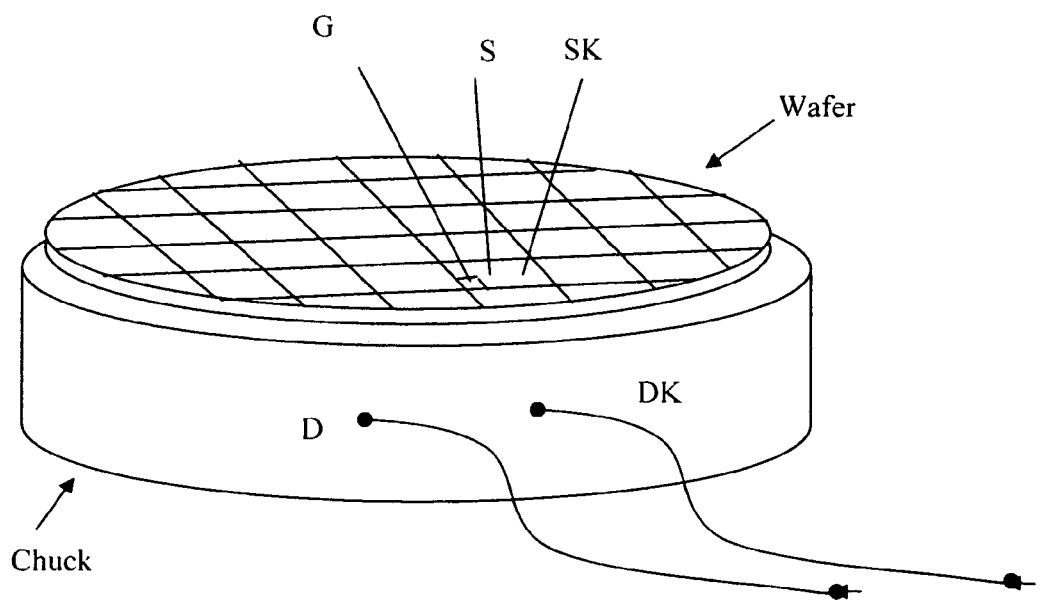
FIG. 2 is a perspective view for showing a probing configuration implemented for measuring the equivalent gate resistance commonly involved in a conventional measurement technique.

Referring to FIG. 5A for the layout of a semiconductor wafer 10 for discussion of an improved configuration of this invention to measure the gate resistance at the wafer level. The semiconductor wafer 10 comprises a plurality of MOSFET transistors 20. A test area 30 that comprises a calibration structure 100 is also disposed on the wafer 10. According to the layout of MOSFET transistor 20 shown in FIG. 5B and an equivalent circuit shown in FIG. 5C, a configuration of calibration as shown with connection to source terminal S and gate terminal G is based on the assumption that the drain connections of the MOSFET device that is not explicit shown in these FIGS. 5B and 5C, may be floated and removed from the circuit without significantly affecting the measurement of Rg. As will be further discussed below, by implementing a calibration configuration of this invention, a drain connection is not required. By removing the drain and the chuck from the resistance measurement removes the most troublesome parasitic capacitance and inductance cause of the drain electrode as most commonly encountered in the conventional measurement configurations.

Figure 6:
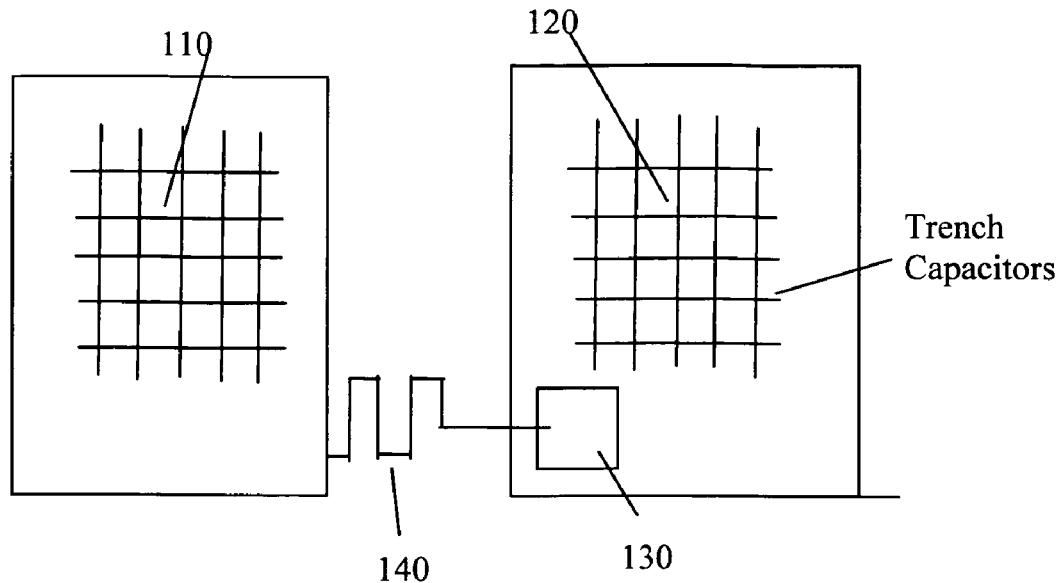
FIG. 6 shows a calibration structure layout with a new measurement configuration by building a known RC network on the wafer for access by a testing probe card.
Figure 7A:
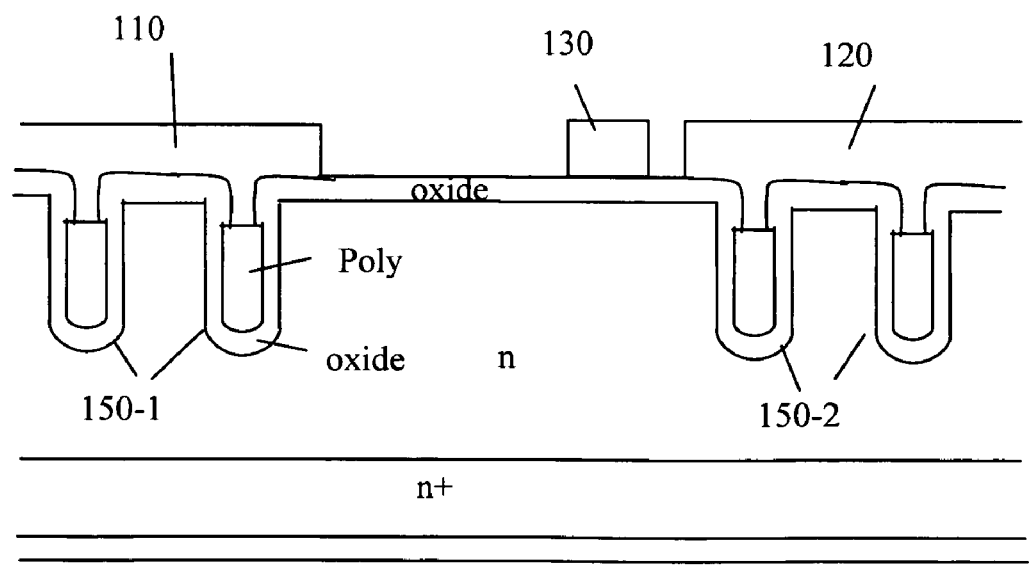
FIG. 7A shows a cross sectional view of the test structure as shown in FIG. 6.
Figure 7B:
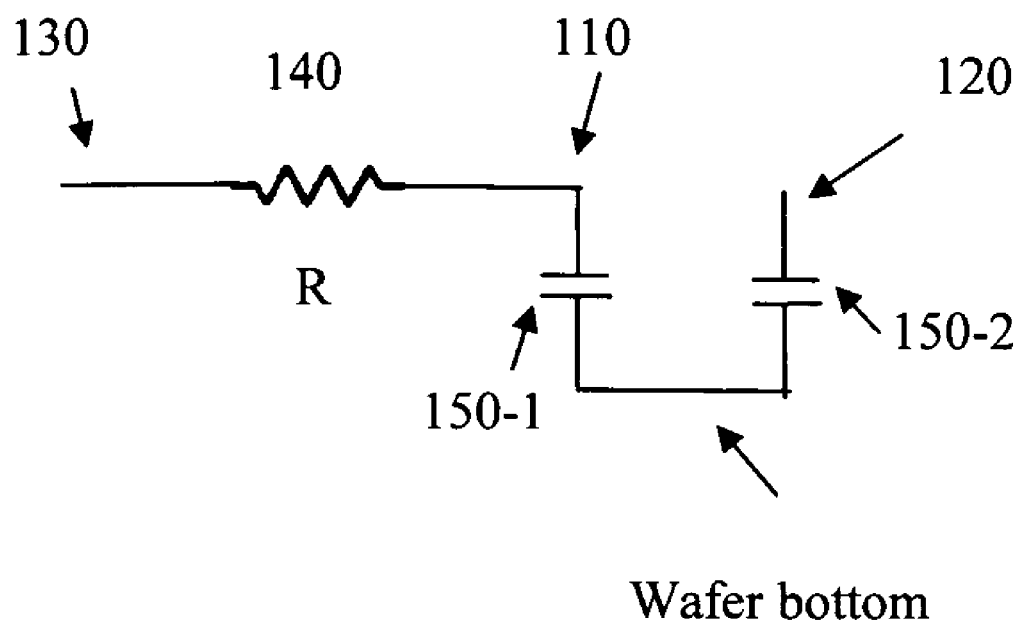
FIG. 7B shows an equivalent circuit diagram of FIG. 7A.

FIG. 6 shows the layout of a test structure that implements a new MOSFET measurement calibration configuration by building a RC network on the wafer for access by a same testing probe card as that used to probe the device. This new test structure 100 may be built in a test field area on the same wafer as the MOSFET transistors. The test field area, e.g., test area 30 as that shown in FIG. 5A, is designed for access by a same probe card as that implemented for gate resistance measurement. The test structure has a source area 110 and another source area 120. The test structure also includes a gate area 130. A metal resistor 140 connects the gate area 130 to source 110. FIG. 7A shows a cross sectional view of the test structure as shown in FIG. 6, and FIG. 7B shows an equivalent circuit diagram of FIG. 7A. The source areas 110 and 120 includes the first Source Pad 110 and the second Source Pad 120 with trench capacitors 150-1 and 150-2 underneath each pad. The Gate metal resistor R 140 is built between gate pad 130 and the first Source Pad 110. The first source Pad 110 and the second Source Pad 120 have very low ESR (Equivalent Series Resistance) capacitors built as shown in FIG. 6 due to the direct contact to the polysilicon in the trenches over the entire area of the first and second source pads 110 and 120.

Figure 8A:
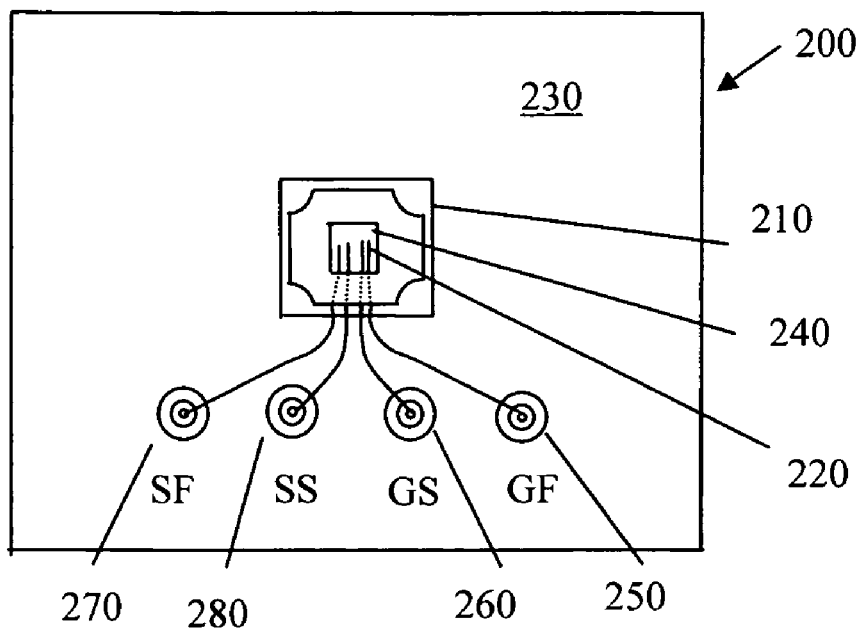
FIG. 8A shows the configuration of one preferred embodiment of probe card.

FIG. 8A shows the bottom of a preferred embodiment of a probe card 200 used for both calibration and measurement. A probe holder 210 holding the probe pins 220 is mounted on a substrate 230 such as PCB with ground planes on both sides. The probe holder 210 has an opening window 240 to expose the probe pins. This opening may go through the PCB substrate 230 to provide an observation window from the top while probing. The probe pins 220 are connected to terminals for connection through cables to tester such as a LCR Meter (not shown). The Cable shields are shorted to ground (not shown). The probe pins 220 are adjusted to extrude the surface of the probe holder such that when probe card touch down the probe holder does not touch the wafer while the probe pins maintain physical contact with the wafer. The probe pins 220 are configured to match the contact pad layouts of the calibration structure and the MOSFET device; therefore the same probe card can access the calibration structure for calibration process and the MOSFET device for measurement. Specifically, during calibration process, the probe card 200 is aligned with the calibration structure on the wafer that the pins 220 connected to GF 250 and GS 260 are in physical contact with gate pad 130, and the pins connected to SF 270 and SS 280 are in physical contact with source pad 120 in FIG. 6. During the process of carrying out a measurement the probe card is aligned with MOSFET device on the wafer that the pins 220 connected to GF 250 and GS 260 are in physical contact with gate pad 23, and the pins connected to SF 270 and SS 280 are in physical contact with source pad 120 in FIG. 5B.

Figure 8B:
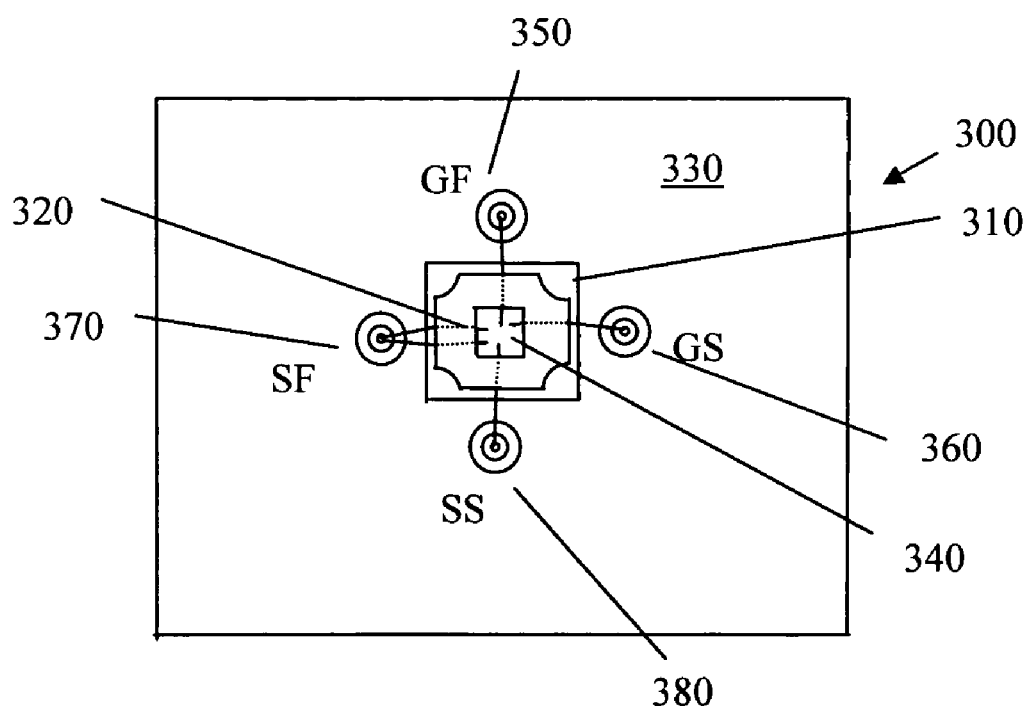
FIG. 8B shows the configuration of another preferred embodiment of probe card.

FIG. 8B shows another preferred embodiment of the probe card 300 in which the terminals are configured such that the lengths of connections between the probe pins 320 and the terminals 350, 360, 370 and 380 are minimized to reduce the straight inductance caused by the unshielded wires connecting the terminals and the probe pins 320 held in a probe holder 310 with a probe window 340 exposing the probe pins 320 supported on a substrate 330. There may be more than one probe pins connected to SF 360 where currents may be more evenly spread and SS 370 may measure the voltage more accurate. The fact that the same probe card being able to access both the calibration structure and the MOSFET device greatly improves the calibration accuracy and simplicity since the conditions for both calibration and measurement are identical even when the drain is floated. With the drain not connected to the testing system, the calibration configuration significantly simplifies the measurement calibration processes because the parasitic capacitance and inductance from connections to the chuck substrate are eliminated. One calibration operation obtains a measurement that includes all the parasitic effects caused by the test system.

With the calibration card shown in FIGS. 8A and 8B, a measurement process is carried out by first measuring the gate resistance R from the gate pad 130 to source pad 110, for example, using a separate DC measurement process with standard adjustable probes on a micro-manipulator using the four-wire method, in which a pair of two wires provide a current flows I through the resistance between the gate pad 130 and source pad 110, another pair of wires measure the voltage drop V over the resistance 140. The resistance between gate pad 130 and source pad 110 is then calculated by R=V/I. Then, the capacitance from Source pad 110 to Source pad 120 is measured, again with these adjustable probes, but at a reduced frequency (say <100 kHz) to minimize inaccuracies from series inductance effects that plague this measurement at high frequency. An open circuit correction is useful to perform here. This capacitance is frequency independent over a frequency range <10 MHz. At this point the resistance and capacitance of the test structure are known. The next step is to use this known load to calibrate the wafer probing system. The probe card is lowered on the test structure with the gate on gate pad 130 and source pins on Source pad 120. The R and capacitance is measured by the probing system. Since the true values of the R and capacitance are already known, the load correction offsets are applied. The measuring system is now calibrated. Subsequent probing measurements from the product die now correctly cancel all the parasitic capacitances and inductances, without needing to determine the individual values for each of these parasitic capacitors and inductors.

In the above test structure, it is recommended that the values of the resistance R and the capacitance C are in the same range as that expected product Rg and capacitance values so that the system is operating at the most accurately calibrated range. This can be accomplished by forming the trench capacitor in the same process as the MOSFET gate. Also, the test signal amplitude must be selected large enough to get noise immunity, but well below the threshold voltage of the power MOS device to avoid switching the device on while doing the measurement.

In essence, this invention discloses a semiconductor wafer that a plurality of semiconductor power chips disposed on a semiconductor wafer wherein the semiconductor wafer further comprises a test area built with a resistor-capacitor (RC) network with a known resistance and capacitance and ready for carrying out a wafer-level semiconductor power device measurement calibration. The semiconductor power wafer further includes a set of contact pads for connecting to a probe card for carrying out the wafer-level semiconductor power device measurement calibration followed by a gate resistance Rg measurement for the semiconductor power chips. In a preferred embodiment, the resistance and capacitance of the RC network are in the same range as the gate resistance Rg and the capacitance of the semiconductor power chips.

Furthermore, this invention discloses a semiconductor power wafer that includes a wafer-level measurement calibration circuit disposed on a semiconductor wafer adjacent to a plurality semiconductor power chips and the drain semiconductor wafer is floated. In a preferred embodiment, the wafer-level measurement calibration. circuit disposed on a semiconductor wafer comprises an RC network.

The present invention further discloses a method for calibrating a gate resistance measurement of a semiconductor power device that includes a step of forming a RC network on a test area on a semiconductor wafer adjacent to a plurality of semiconductor power chips and measuring a resistance and a capacitance of the RC network to prepare for carrying out a wafer-level measurement calibration of the semiconductor power device. The method further includes a step of connecting a probe card to a set of contact pads on the semiconductor wafer for carrying out the wafer-level measurement calibration followed by performing a gate resistance Rg measurement for the semiconductor power chips. In a preferred embodiment, the step of the forming the RC network further comprises forming a resistance and capacitance of the RC network having a range approximately the same as a range of a gate resistance Rg and capacitance of the semiconductor power chips.

In alternate preferred embodiment, this invention further discloses a method for carrying out a wafer-level semiconductor power device measurement calibration. The method includes a step of forming a wafer-level measurement calibration circuit on a semiconductor wafer adjacent to a plurality semiconductor power chips for carrying out the wafer-level measurement calibration with the drain floated. In a preferred embodiment, the step of forming a wafer-level measurement calibration circuit on a semiconductor wafer further comprises forming an RC network.

The same technique may be used for the series RLC resonant method. Once the R and C of the test structure are measured and known, the results of the RLC resonance point from actually measuring the test structure (gate pad G to source pad S2) may be corrected by offsetting the measured R and C to match the known values. Thereafter, the same correction is applied to the product die, leading to accurate Rg measurements.

Although the present invention has been described in terms of the presently preferred embodiment, it is to be understood that such disclosure is not to be interpreted as limiting. Various alterations and modifications will no doubt become apparent to those skilled in the art after reading the above disclosure. Accordingly, it is intended that the appended claims be interpreted as covering all alterations and modifications as fall within the true spirit and scope of the invention.

We claim:

1. A method for calibrating a MOSFET gate resistance measurement comprising:
   forming a RC network on a test area on a semiconductor wafer adjacent to a plurality of MOSFET chips disposed on said semiconductor wafer; and
   said step of forming said RC network further comprises forming a resistance and capacitance of said RC network having a range approximately the same as a range of a MOSFET gate resistance Rg and a capacitance of said MOSFET chips.

2. The method of claim 1 further comprising:
   measuring a resistance and a capacitance of said RC network for carrying out a wafer-level MOSFET measurement calibration.

3. The method of claim 2 further comprising:
   connecting a probe card to said RC network on said semiconductor wafer for carrying out said wafer-level MOSFET measurement calibration.

4. The method of claim 3 further comprising:
   connecting said probe card to said MOSFET chips to perform said gate resistance measurement on wafer level.

5. A method for carrying out a wafer-level MOSFET measurement calibration comprising:
   forming a wafer-level measurement calibration circuit on a semiconductor wafer adjacent to a plurality MOSFET chips for carrying out said wafer-level MOSFET measurement calibration without connecting a drain of said MOSFET chips to a voltage source; and
   said step of forming said wafer-level measurement calibration circuit further comprising a step of forming RC network with a resistance and capacitance of said RC network having a range approximately the same as a range of a MOSFET gate resistance Rg and a capacitance of said MOSFET chips.

6. A method for calibrating a gate resistance measurement of a semiconductor power device comprising:
   forming a RC network on a test area on a semiconductor wafer adjacent to a plurality of semiconductor power chips and measuring a resistance and a capacitance of said RC network for carrying out a wafer-level measurement calibration of said semiconductor power device; and
   said step of forming said RC network further comprises forming a resistance and capacitance of said RC network having a range approximately the same as a range of a gate resistance Rg of said semiconductor power chips and a capacitance of said semiconductor power chips.

7. The method of claim 6 further comprising:
   connecting a probe card to a set of contact pad on said semiconductor wafer for carrying out said wafer-level measurement calibration followed by performing a gate resistance Rg measurement for said semiconductor power chips.

8. A method for carrying out a wafer-level semiconductor power device measurement calibration comprising:
   forming a wafer-level measurement calibration circuit on a semiconductor wafer adjacent to a plurality semiconductor power chips for carrying out said wafer-level measurement calibration without connecting a drain of said semiconductor power chips to a fixed voltage source; and
   said step of forming said RC network further comprises forming a resistance and capacitance of said RC network having a range approximately the same as a range of a gate resistance Rg of said semiconductor power chips and a capacitance of said semiconductor power chips.

* * * * *